United States Patent

[11] 3,599,593

| [72] | Inventor | Edward Nelles George Fleming<br>3931 Bradshaw Diversion, R.R. #2,<br>Langely B.C., Canada |
|---|---|---|
| [21] | Appl. No. | 830,330 |
| [22] | Filed | June 4, 1969 |
| [45] | Patented | Aug. 17, 1971 |

[54] AUTOMOBILE FERRY
4 Claims, 4 Drawing Figs.

| [52] | U.S. Cl. | 115/0.5 |
|---|---|---|
| [51] | Int. Cl. | B63f 3/00 |
| [50] | Field of Search | 115/0.5 A |

[56] References Cited
UNITED STATES PATENTS

| 1,568,307 | 1/1926 | Acocella | 115/0.5 |
|---|---|---|---|
| 2,342,535 | 2/1944 | Frova | 115/0.5 |
| 3,332,388 | 7/1967 | Moraski | 115/0.5 |

*Primary Examiner*—Andrew H. Farrell
*Attorney*—Lyle G. Trorey

ABSTRACT: A combination ferry and trailer device for an automobile, to be towed behind the automobile on land and serving as an automobile ferry on water. When the device is waterborne with the automobile loaded, it is propelled by the automobile engine, rollers engaging rear wheels of the car transmit engine power to a propeller. The device also has a pair of outrigger pontoons for stabilization.

INVENTOR.
Edward N.G. Fleming

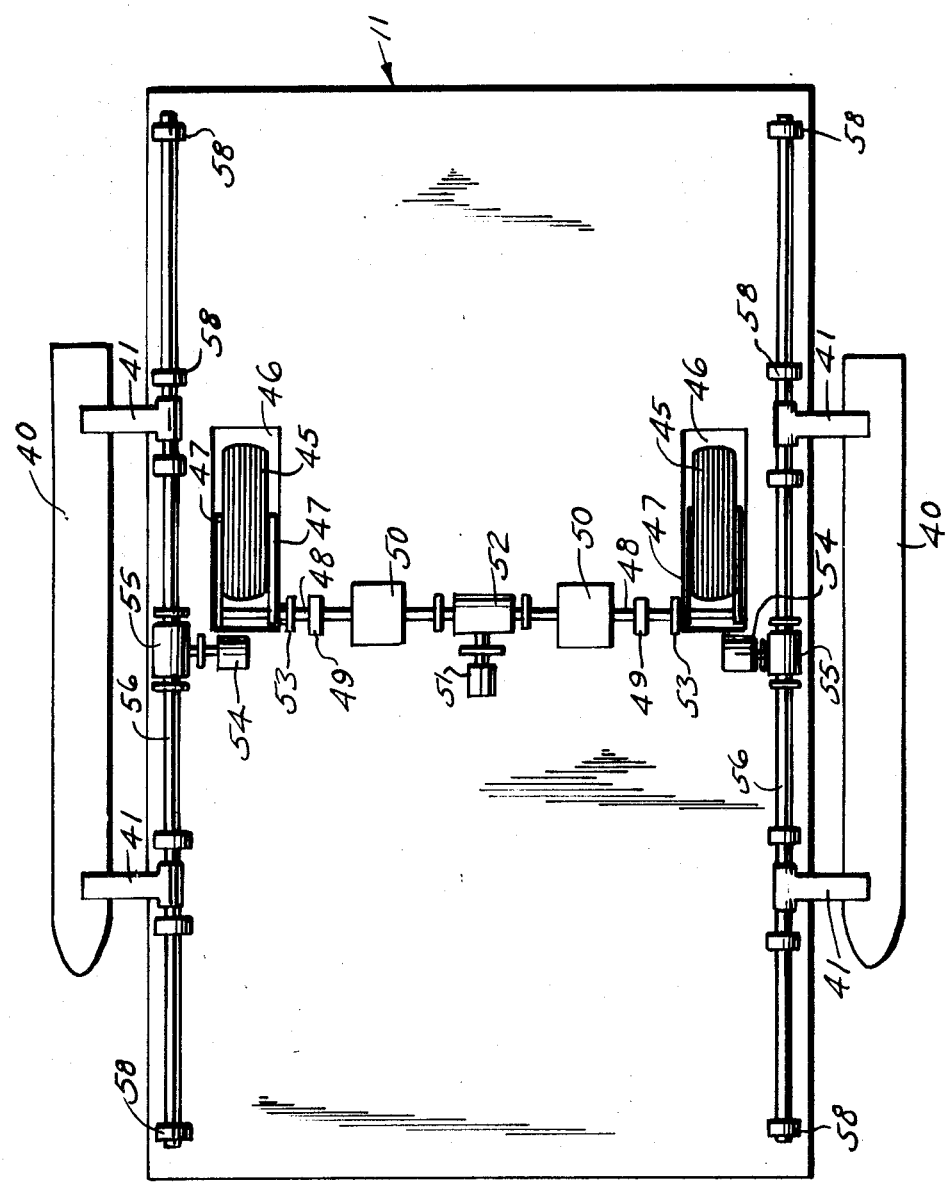

AUTOMOBILE FERRY

BACKGROUND OF THE INVENTION

1. Field of the Invention

This invention is related to boats, and more particularly to a boat and trailer combination for transporting a vehicle across a body of water.

2. Prior Art

Isolated areas on inlets and lakes are often inaccessible by road, and an economical form of transport is by boat—this is sometimes an organized ferry service which can take automobiles. Some areas do not have a ferry service and automobiles are usually stored while travellers proceed by boat to the isolated area, where further transportation difficulties can arise as isolated areas are often not served with public transport or car hire facilities.

SUMMARY OF THE INVENTION

The invention contemplates a combination ferry and trailer device which can be towed as a trailer behind an automobile when on land, and also serves as a ferry for transporting the automobile and passengers across a body of water. The device has wheels and a tow hitch for towing behind the automobile when on the land, the wheels and tow hitch being retractable when the device serves as a ferry. A retractable loading ramp permits the automobile to be driven onto tracks on a top deck of the device when used as a ferry, the device having a hull which is equipped with a rudder, and with a propeller mounted on a propeller shaft.

The ferry is not equipped with an engine, but uses power from the automobile engine, which power is transmitted through rear wheels of the automobile, the wheels resting on rollers mounted in the tracks, through a transmission to the propeller shaft. The rollers can be locked with a brake, permitting the automobile to drive on and off the deck. Steering means on the deck are in operable engagement with front wheels of the automobile, turning of the steering column effecting rotation of the rudder. Outrigger pontoons can be extended from the hull improving lateral stability.

A detailed disclosure following, related to drawings, describes one embodiment of the invention, which however is capable of expression in structure other than that particularly described and illustrated.

DESCRIPTION OF THE DRAWINGS

FIG. 4 is a diagrammatic plan view showing an alternative pontoon mechanism and a wheel mechanism.

DETAIL DISCLOSURE

Figure 1:
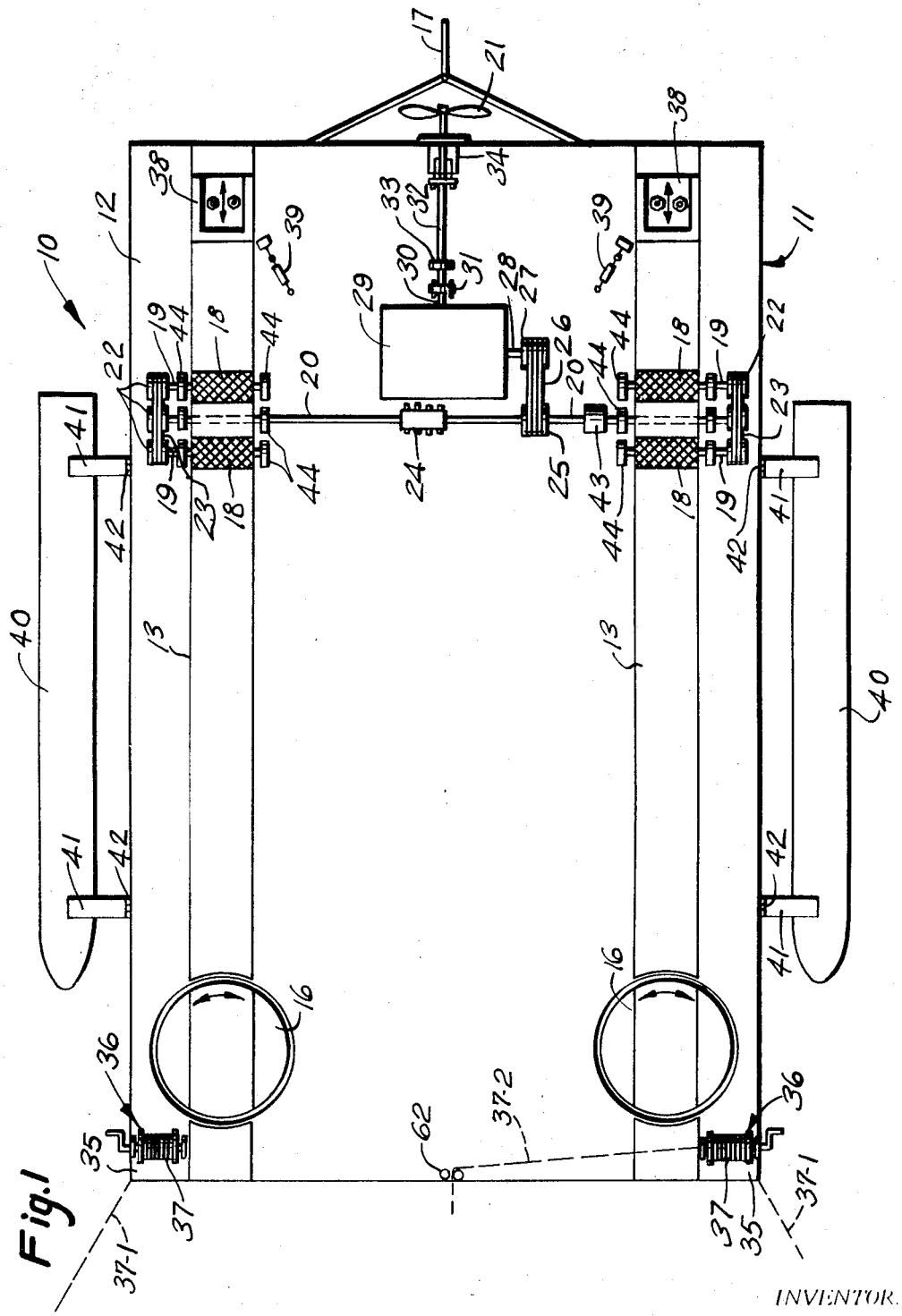
FIG. 1 is a top plan view of a combination ferry and trailer device according to the present invention.
Figure 2:
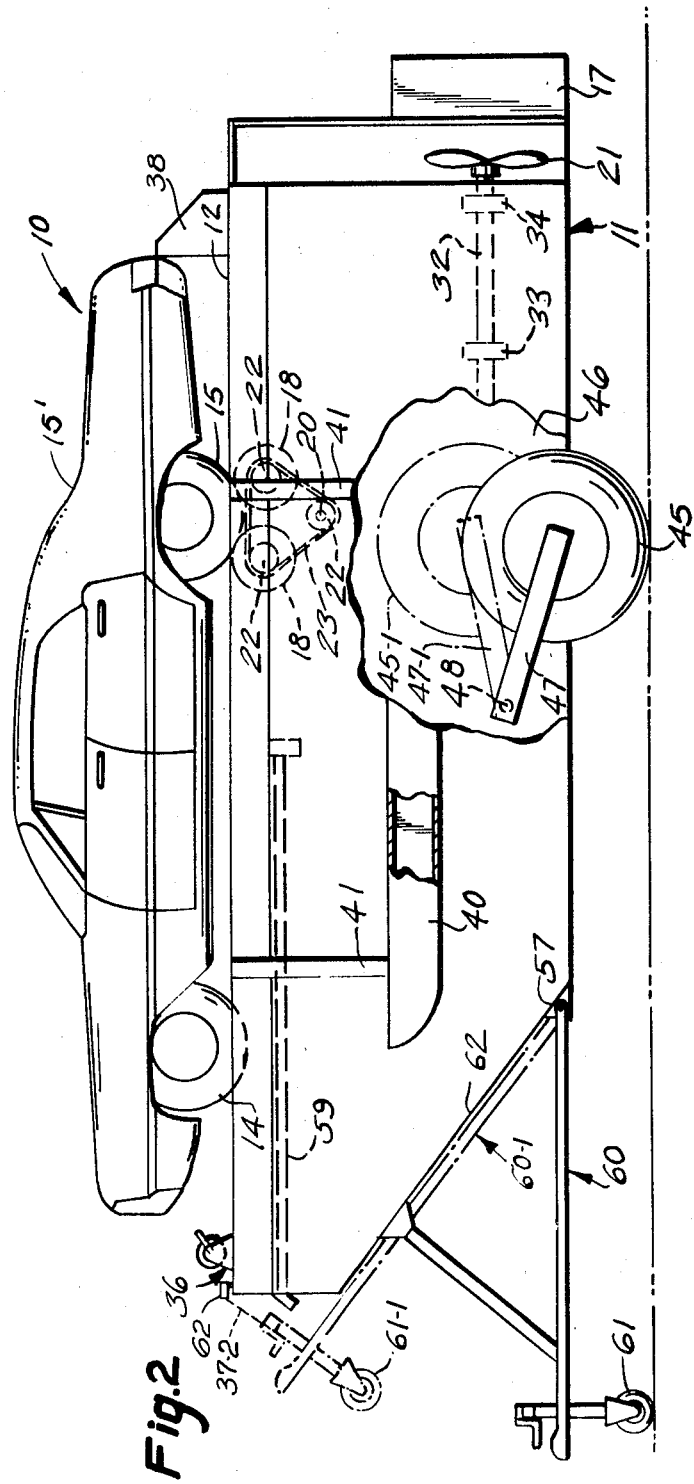
FIG. 2 is a side view of FIG. 1 with portions removed to show internal parts, some parts shown in phantom lines to show raised portions.

FIGS. 1 and 2 with reference to FIG. 4

An automobile ferry 10 according to the invention has a hollow hull 11 having a top deck 12, upon which is a pair of parallel tracks 13 to accept pairs of front and rear wheels 14 and 15 of an automobile 15', the wheels 15 providing the drive means for ferry 10.

Turntables 16 are provided at forward ends of the tracks 13 and accept the front wheels 14 of the automobile 15', a driver of automobile steering the ferry 10 by means of the steering column (not shown) of the automobile. Movement of the front wheels 14 by the steering column rotates the turntables 16, which are attached by coupling means (not shown) to a rudder 17, permitting steering of the ferry upon water. A pair of exposed parallel spaced-apart rollers 18 are provided adjacent each rear portion of the tracks 13, the rollers being covered with serrated rubber to increase friction between the rear wheels 15, of the automobile 15'. Each of the rollers 18 is secured to a roller shaft 19, which shafts are spaced apart on either side of central shafts 20, the shafts 20 being secured with a split coupling 24 and providing drive means for a propeller 21 to be described.

Pulleys 22 are secured to the shafts 19 and 20, the pulleys carrying belts 23. Pulleys 25 are secured to one of the shafts 20 and endless belts 26 extend between the pulleys 25 and pulleys 27 on a shaft 28 of a reduction gear box 29. An output shaft 30 of the gear box 29 is secured to a coupling 31 which couples the output shaft 30 to a propeller shaft 32, which shaft is journaled in a bearing 33, and a further bearing and packing gland 34.

As will be noted in the drawing, the drive wheels 15 of the automobile 15' frictionally engage the rollers 18, thus imparting torque to the shafts 20, that torque being transmitted to the reduction gear box 29 which will drive the propeller 21 by means of a propeller shaft 32 coupled to the shaft 30 of the gear box 29.

Manually operated winches 36 are secured at frontmost corners 35 of the top deck 12, the winches containing cables 37 for the purposes of mooring the auto ferry 10 to a shore to hold the ferry in shore whilst loading and unloading. The winches are mounted on turntables (not shown) so that they can be swung to permit alignment of the cables with the winches when the cables are extended at an angle to the ferry as shown at 37.1, which angle improves mooring of the ferry.

It will be noted that adjustable rear stops 38 are located at the rearmost portion of the track 13, to reduce chances of the automobile 15' rolling rearwards upon top deck 12. A pair of rear differential housing turnbuckle anchors 39 are located upon the top deck 12 to aid in securing the automobile 15' when on the deck 12. The ferry 10 has a pair of outrigger pontoons 40 which are supported by struts 41, which struts are secured by hinges 42 to the hull 11, the pontoons 40, when extended, serving to improve lateral stability for the hull 11 when it is propelled through the water.

A hydraulic or mechanically operated brake 43 mounted on one of the shafts 20 serves to lock the rollers 18 to enable the automobile 15' to ascend or descend from the rollers 18. The rollers 18 are journaled with roller bearings 44 reducing frictional loss of torque attainable at propeller 21.

The ferry 10 has a pair of retractable wheels 45 which can be retracted to a retracted position 45.1 (in phantom outline) within wheel wells 46. The wheels 45 are journaled on a pair of parallel arms 47 (see FIG. 4) secured to a shaft 48, and are retracted by swinging the arms 47 to a raised position 47.1 (in phantom outline). The retraction of the wheels into the wells reduces drag of the ferry, permitting attainment of higher speeds than would be attained with the wheels lowered.

Figure 3:
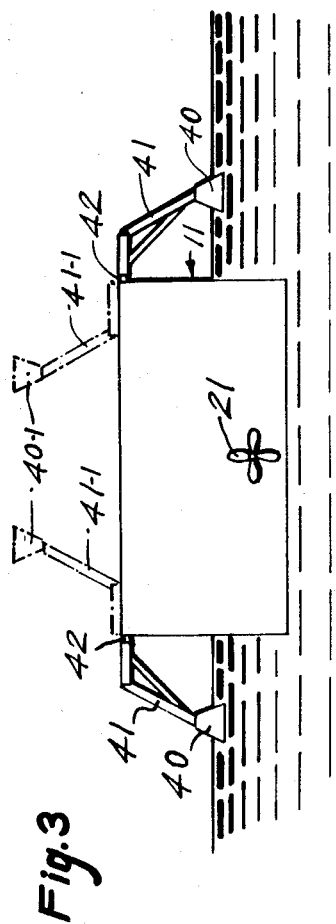
FIG. 3 is a fragmentary rear view of the invention showing pontoons in an extended position in the water and also showing the pontoons in phantom lines in a retracted position.

FIGS. 3 and 4

With reference to FIG. 3, when the ferry is changed from a trailer to a boat, the pontoons and struts are lowered from retracted positions 40.1 and 41.1 (phantom lines) by rotating the struts about the hinges 42 to an extended position as shown. The wheels 45 are journaled on an axle between the parallel arms 47 secured to the shafts 48 within the hull 11. The shafts 48 are journaled in bearings 49 and are carried within wheel suspensions 50 and within packing glands 53. A 12-volt direct current motor 51 serves to drive a right-angle reduction drive 52 which rotates the shafts 48 in order to extend or retract the wheels 45 when desired.

With reference to FIG. 4, the pontoons 40 may also be mounted by securing each to a pair of parallel shafts 56 journaled in bearings 58 on each side of the top deck 12, thus eliminating the hinges 42. A pair of reversible electric motors 54 secured each to reduction units 55 and serve to rotate the parallel shafts 56 carrying the pontoons 40 in order to raise or lower them when desired. The pontoons 40 can be raised slightly for smooth water to attain a higher speed and may be lowered for use upon rough water.

FIGS. 1 and 2

A pair of removable ramps 59 are carried within the hull 11 below the deck 12 and provides a means for automobile 15′ to drive on or off the deck 12, when the ramps are erected and aligned with the tracks 13.

A tow hitch 60 is hinged at a pin 57 and includes a pivotable wheel 61. When the ferry 10 is in the water, the tow hitch 60 is raised and the retractable wheels 45 are raised within the wells 46 to reduce water drag.

The tow hitch 60 may be swung up from a lowered position at 60 to a raised position 60.1 (phantom lines) against the front of hull 11, the hitch being rotated about the hinge pin 57 by one of the cables 37, shown in a position 37.2. The cable 37.2 extends through a small fair-lead 62 mounted at the front top center of the deck 12, and because the winch is mounted on a turntable (also not shown), the winch may be rotated approximately 120° to be in alignment with the fair-lead. In the lowered position the hitch serves as a means for hitching the ferry as a trailer to the automobile for towing the ferry on land, and in the raised position water drag on the hitch is reduced.

I claim:

1. An automobile ferry (10) for floating an automobile (15′) and transporting it across a body of water; the ferry having wheels (45) and a tow hitch (60) permitting it to be towed behind the automobile, a hull (11), a top deck (12), pontoons (40) on each side of the hull to improve lateral stability and a propeller shaft (32) journaled in the hull and sealed from water, the propeller shaft carrying a propeller (21); in combination with the foregoing, a. two parallel tracks (13), having front and rear ends, the tracks being located on the top deck to accept the wheels (15) of the automobile,
   b. a pair of spaced rollers (18) adjacent a rear end of each track to accept each rear wheel (15) of the automobile, the rollers being covered with serrated rubber to increase friction between the wheels and the rollers, and being secured to shafts (19), which shafts are journaled for rotation and, by belts (23) and pulleys (22), are coupled to, and spaced apart on either side of, two central shafts (20), the central shafts being coupled together and, by belts (26) and pulleys (25) and (27), are coupled through a reduction gear box (29) to the propeller shaft so that rotation of the rear wheels rotates the propellers,
   c. a pair of turntables (16) adjacent the front end of each track, each turntable accepting a front wheel (14) of the automobile and being operatively connected to a rudder (17) so that rotation of the steering column of the automobile rotates each turntable, which, through coupling means rotates the rudder so as to permit steering of the ferry,
   d. a pair of removable ramps (59) adapted so that, when erected and aligned with the tracks, the automobile can drive on and off the deck,
   e. a pair of parallel shafts (56) spaced on either side of the hull and journaled for rotation, struts 41 securing the pontoons (40) to the parallel shafts, and motors (54) adapted to rotate the shafts (56) so as to extend or retract the pontoons,
   f. adjustable stop means (38) at rear most portions of the tracks (13) to reduce chance of the automobile rolling rearwards off the deck of the ferry.

2. Structure as defined in claim 1, including:

g. a brake (43) on one of the central shafts (20) to prevent rotation of the shaft and the rollers (18) relative to the ferry, enabling the automobile to drive on and off the track of the deck and to be positioned on the rollers with negligible rotation of the rollers,
   h. a pair of differential housing turnbuckle anchors (39) located on the top deck to aid in securing the automobile when on the deck of the ferry,
   i. a pair of winches (36) located on either side of the ferry to anchor the ferry to shore so that the automobile can drive on and off the ferry,
   j. wheels (45) of the ferry journaled on axles between a pair of parallel arms (47) secured to shafts (48), so that rotation of the shafts (48) raises the wheels into wheel wells (46), reducing water drag of the ferry.

3. Structure as defined in claim 2, in which the tow hitch (60) is hinged at a pin (57) so that it can swing up against the hull to a raised position (60.1) to reduce water drag, and so that when the hitch in a lowered position serves as a means for hitching the ferry as a trailer to the automobile for towing the ferry on land, the hitch being provided with a rotatable wheel (61).

4. Structure as defined in claim 3, in which the tow hitch is swung up against the hull by one of the cables (37) passing through a fair-lead (62), the winch (36) being mounted on a turntable permitting rotation of the winch and alignment with the fair-lead.